US011205418B2

(12) United States Patent
Leone et al.

(10) Patent No.: US 11,205,418 B2
(45) Date of Patent: Dec. 21, 2021

(54) MONOTONE SPEECH DETECTION

(71) Applicant: Microsoft Technology Licensing, LLC, Redmond, WA (US)

(72) Inventors: John Christian Leone, Milpitas, CA (US); Amit Srivastava, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/931,373

(22) Filed: May 13, 2020

(65) Prior Publication Data
US 2021/0358476 A1 Nov. 18, 2021

(51) Int. Cl.
*G10L 15/02* (2006.01)
*G06K 9/62* (2006.01)
(Continued)

(52) U.S. Cl.
CPC .............. *G10L 15/02* (2013.01); *G06F 17/18* (2013.01); *G06K 9/6223* (2013.01); *G10L 15/22* (2013.01);
(Continued)

(58) Field of Classification Search
CPC ............. G10H 2210/331; G10H 1/366; G10H 2210/066; G10H 1/02; G10H 2210/056; G10H 2210/091; G10H 2210/211; G10H 2210/385; G10L 21/013; G10L 13/0335; G10L 15/26; G10L 25/90; G10L 15/063; G10L 13/00; G10L 13/10; G10L 15/06; G10L 15/1807; G10L 21/003; G10L 25/60; G06F 3/165
See application file for complete search history.

(56) References Cited

U.S. PATENT DOCUMENTS 8,831,942 B1\* 9/2014 Nucci ..................... G10L 17/26
704/246
9,691,296 B2\* 6/2017 Hoque ..................... G09B 7/00
(Continued)

OTHER PUBLICATIONS

Hincks, Rebecca, "measures and perceptions of liveliness in student oral presentation speech: a proposal for an automatic feedback mechanism", Sep. 4, 2005, In proceedings of the Ninth European Conference on Speech Communication and Technology, pp. 765-768 (Year: 2005).\*

(Continued)

*Primary Examiner* — Linda Wong

(57) ABSTRACT

Examples of the present disclosure describe systems and methods for detecting monotone speech. In aspects, audio data provided by a user may be received a device. Pitch values may be calculated and/or extracted from the audio data. The non-zero pitch values may be divided into clusters. For each cluster, a Pitch Variation Quotient (PVQ) value may be calculated. The weighted average of PVQ values across the clusters may be calculated and compared to a threshold for determining monotone speech. Based on the comparison, the audio data may be classified as monotone or non-monotone and an indication of the classification may be provided to the user in real-time via a user interface. Upon the completion of the audio session in which the audio data is received, feedback for the audio data may be provided to the user via the user interface.

20 Claims, 14 Drawing Sheets

(51) Int. Cl.
*G06F 17/18* (2006.01)
*G10L 15/22* (2006.01)

(52) U.S. Cl.
CPC .. *G10L 2015/022* (2013.01); *G10L 2015/225* (2013.01)

(56) References Cited

U.S. PATENT DOCUMENTS

| | | | | |
|---|---|---|---|---|
| 2011/0082698 | A1* | 4/2011 | Rosenthal | A61B 5/1118 704/270.1 |
| 2018/0151164 | A1* | 5/2018 | Salazar | G10L 21/013 |
| 2018/0336915 | A1* | 11/2018 | Jalali | G10L 21/16 |
| 2020/0219517 | A1* | 7/2020 | Wang | G10L 15/26 |
| 2021/0090576 | A1* | 3/2021 | Salazar | G09B 5/00 |

OTHER PUBLICATIONS

Hincks, Measures and perceptions of liveliness in student oral presentation speech: a proposal for an automatic feedback mechanism, Dec. 2005, In Journal of System, vol. 33, Issue 4, pp. 575-591 (Year: 2005).*

Chan, Hang, "Using Pitch and Length Information to Assess Speech Prosody: A Parallel Approach", In Journal of English Teaching and Learning, vol. 43, Issue 2, Jan. 7, 2019, 2 Pages.

Hincks, Rebecca, "Measures and perceptions of liveliness in student oral presentation speech: A proposal for an automatic feedback mechanism", In Journal of System, vol. 33, Issue 4, Dec. 2005, pp. 575-591.

Hincks, Rebecca, "Measuring liveliness in presentation speech", In Proceedings of the Ninth European Conference on Speech Communication and Technology, Sep. 4, 2005, pp. 765-768.

* cited by examiner

MONOTONE SPEECH DETECTION

BACKGROUND

Effective public speaking requires a voice that can capture the attention of an audience. Of the numerous prosodic variables that are comprised by such a voice, pitch is among the most important. A voice that is without adequate variations of pitch is flat, unengaging, and classified as monotone. Generally, prolonged use of monotone speech causes disinterest and boredom in an audience, which may severely degrade the impact of the speaker's message.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for detecting monotone speech. In aspects, audio data provided by a user may be received from one or more devices. Pitch values may be extracted and/or computed from the audio data. The non-zero pitch values may be divided into clusters. For each cluster, a Pitch Variation Quotient (PVQ) value may be calculated. The weighted average of PVQ values across the clusters may be calculated. The weighted PVQ value may be compared to a threshold for determining monotone speech. Based on the comparison, the audio data may be classified as monotone or non-monotone. Upon classification of the audio data, an indication of the classification may be provided to the user in real-time. Additionally, the classification may be added to a sliding window of time segments corresponding to the audio data. Upon the completion of the audio session in which the audio data is received, feedback for the audio data may be provided to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
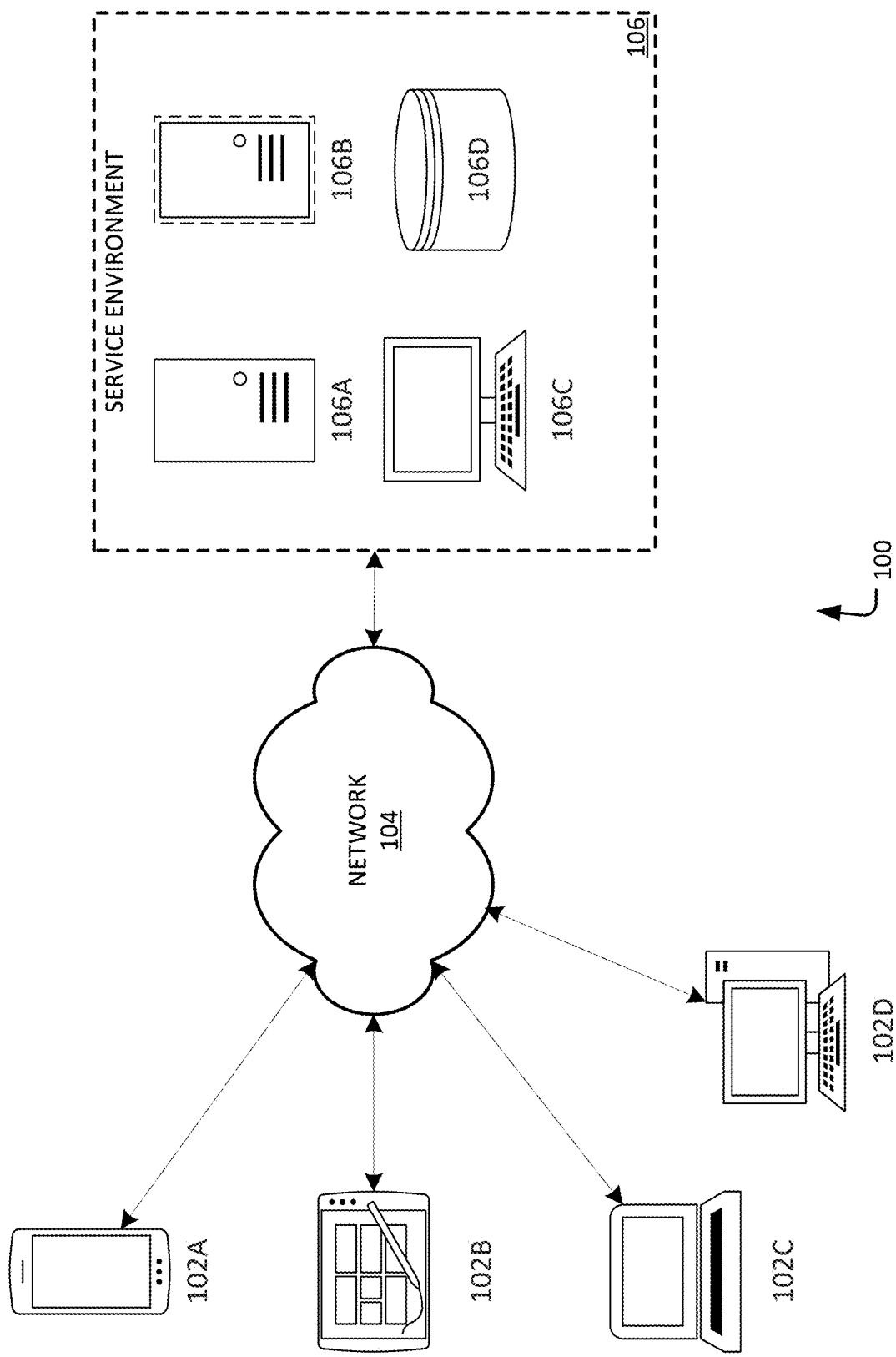
FIG. 1 illustrates an overview of an example system for detecting monotone speech and providing real-time feedback as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Effective public speaking generally requires a voice that varies in pitch, tempo, and intensity. Given the importance of effective public speaking, various approaches have been developed to provide speech analysis. Typically, these approaches attempt to quantify prosodic variation, measure speaking rate and pause time, and/or search for repetitive pitch contours that may be negatively perceived by an audience. In some of these approaches, the analysis of pitch is performed using the pitch variation quotient (PVQ). PVQ is derived from the pitch contours of audio content and represents a ratio of standard deviation of a pitch to the mean of the pitch. Generally, PVQ is used to identify monotone speech. Although PVQ is a powerful tool, existing systems that use PVQ to analyze pitch assume that pitch values are selected from a unimodal distribution (e.g., male or female), which varies pitch parameters of the analysis. As such, PVQ is often an inaccurate metric for evaluating pitch values in a bimodal distribution. That is, PVQ may not accurately evaluate voices across sexes or genders when the sex or gender of the speaker is unknown to the system. Specifically, PVQ does not consistently detect monotone regions in female speech using a sex- or gender-independent threshold due to the generally higher variation in female pitch.

To address the challenges with such system, the present disclosure describes systems and methods for detecting monotone speech. In aspects, audio data may be provided by a user during an audio data session. The audio data may include user speech corresponding to, for example, a presentation, a lecture, a performance, etc. The audio data may be received by a speech evaluation service configured to detect monotone speech. The speech evaluation service may buffer the audio data into multiple sliding time windows. For each sliding time window, the speech evaluation service may identify and/or extract pitch values from the corresponding audio data. Smoothing logic may be applied to the pitch values to reduce anomalies. Pitch values of zero, which correspond to unvoiced speech frames, may be removed from the audio data. The non-zero pitch values may be divided into two clusters. One cluster may represent voices considered to be male and the other cluster may represent voices considered to female. For each cluster, a PVQ value may be calculated using the standard deviation and the mean of the cluster. The weighted average of PVQ values across the clusters may be calculated.

In aspects, the weighted PVQ value may be compared to a threshold value for determining monotone speech. The threshold may be predefined, configured by the user, or determined automatically by the speech evaluation service. Based on the comparison to the threshold value, the audio data for the sliding time window may be classified as monotone or non-monotone. Upon classification of the audio data, an indication of the classification may be provided to the user in real-time. For example, a visual, audio, and/or haptic indication (e.g., a message, an alert, a notification, etc.) that the audio data was (or was not) monotone may be provided to a client device of the user at the conclusion of each sliding time window. Additionally, the classifications for each sliding time window may be stored throughout the audio data session. In some aspects, to prevent anomalous classifications from creating erratic notification behavior, smoothing logic may be applied to the audio data and/or the stored classifications. The smoothing logic may remove noise (e.g., meaningless and/or incorrect data) from the audio data. Upon the completion of the audio session, feedback for the audio data session may be provided to the user. In examples, the feedback may comprise information, such as the classifications from each of the sliding time windows, summary statistics, advice/recommendations, and the like.

Accordingly, the present disclosure provides a plurality of technical benefits including but not limited to: improving monotone speech detection in bimodal distributions, improved detection of monotone regions in female speech, using a gender-independent threshold to improve PVQ metrics, providing multi-modal (e.g., visual, audio, haptic, etc.) real-time notifications of monotone speech detection, applying smoothing logic to audio data to remove false positives and noise, providing automated and effective techniques for improving public speaking skills, among other examples.

FIG. 1 illustrates an overview of an example system for detecting monotone speech and providing real-time feedback as described herein. Example system 100 as presented is a combination of interdependent components that interact to form an integrated whole for detecting monotone speech. Components of the systems may be hardware components or software components implemented on and/or executed by hardware components of the systems. In one example, system 100 may provide an operating environment for software components to execute and utilize resources or facilities of system 100. An example of one or more processing devices comprising such an operating environment is depicted in FIGS. 9-12. In another example, the components of systems disclosed herein may be distributed across multiple devices. For instance, input may be entered on a client device and information may be processed or accessed from other devices in a network, such as one or more cloud or remote server devices.

As one example, system 100 comprises computing devices 102A-D, network 104, service environment 106, and computing devices 106A-D. One of skill in the art will appreciate that the scale of systems such as system 100 may vary and may include more or fewer components than those described in FIG. 1. Examples of computing devices 102A-D include, but are not limited to, a personal computer (PC), a mobile device (e.g., smartphone/phone, tablet, laptop, personal digital assistant (PDA), etc.), a wearable device (e.g., smart jewelry, a body-mounted device, etc.), or the like. In aspects, computing devices 102A-D may comprise, or have access to, one or more software applications or services that collect input from users using one or more sensor devices. Examples of software applications or services include, but are not limited to, presentation tools, word processing tools, spreadsheet tools, calendar/tasking tools, messaging tools, content discovery/retrieval tools, personal digital assistant tools, etc. The collected input may include, for example, voice input, touch input, text-based input, gesture input, and/or video/image input. Examples of sensor devices include microphones, touch-based sensors, keyboards, pointing/selection tools, optical/magnetic scanners, accelerometers, magnetometers, gyroscopes, etc. Computing devices 102A-D may be In aspects, computing devices 102A-D may provide at least collected audio input to one or more speech processing services. The collected audio input may represent at least a portion of a current speaking session. The speech processing services may be installed on or accessed locally by computing devices 102A-D. Alternately, the speech processing services may be accessed remotely by computing devices 102A-D. For example, computing devices 102A-D may transmit the collected audio input to an external device or service, such as service environment 106, via network 104. Although service environment 106 is illustrated as external to computing devices 102A-D, it is contemplated that service environment 106 may be provided by, or locally accessible to, computing devices 102A-D. In examples, service environment 106 may comprise computing devices 106A-D. Examples of computing devices 106A-D include, but are not limited to, a PC, a server device, a cloud computing device, a virtual device, a data store, or the like. In at least one example, service environment 106 may additionally or alternately comprise computing devices 102A-D.

Upon receiving the collected audio input, the speech processing services may perform speech processing techniques relating to monotone speech detection. For example, the speech processing services may buffer the collected audio input into one or more sliding time windows. For each sliding time window, a weighted average of PVQ may be estimated for one or more clusters of pitch values derived from the collected audio input. Based on the estimated PVQ, a notification or an indication regarding the detection of monotone (or non-monotone) speech may be provided to computing devices 102A-D in real-time for the particular sliding time window. At the conclusion of the speaking session, the speech processing services may generate feedback for the speaking session. The feedback may be provided to computing devices 102A-D. In aspects, the user that received the monotone detection notification/indication and the speaking session feedback provided to computing devices 102A-D, may use the information to improve the user's public speaking skills and knowledge.

Figure 2:
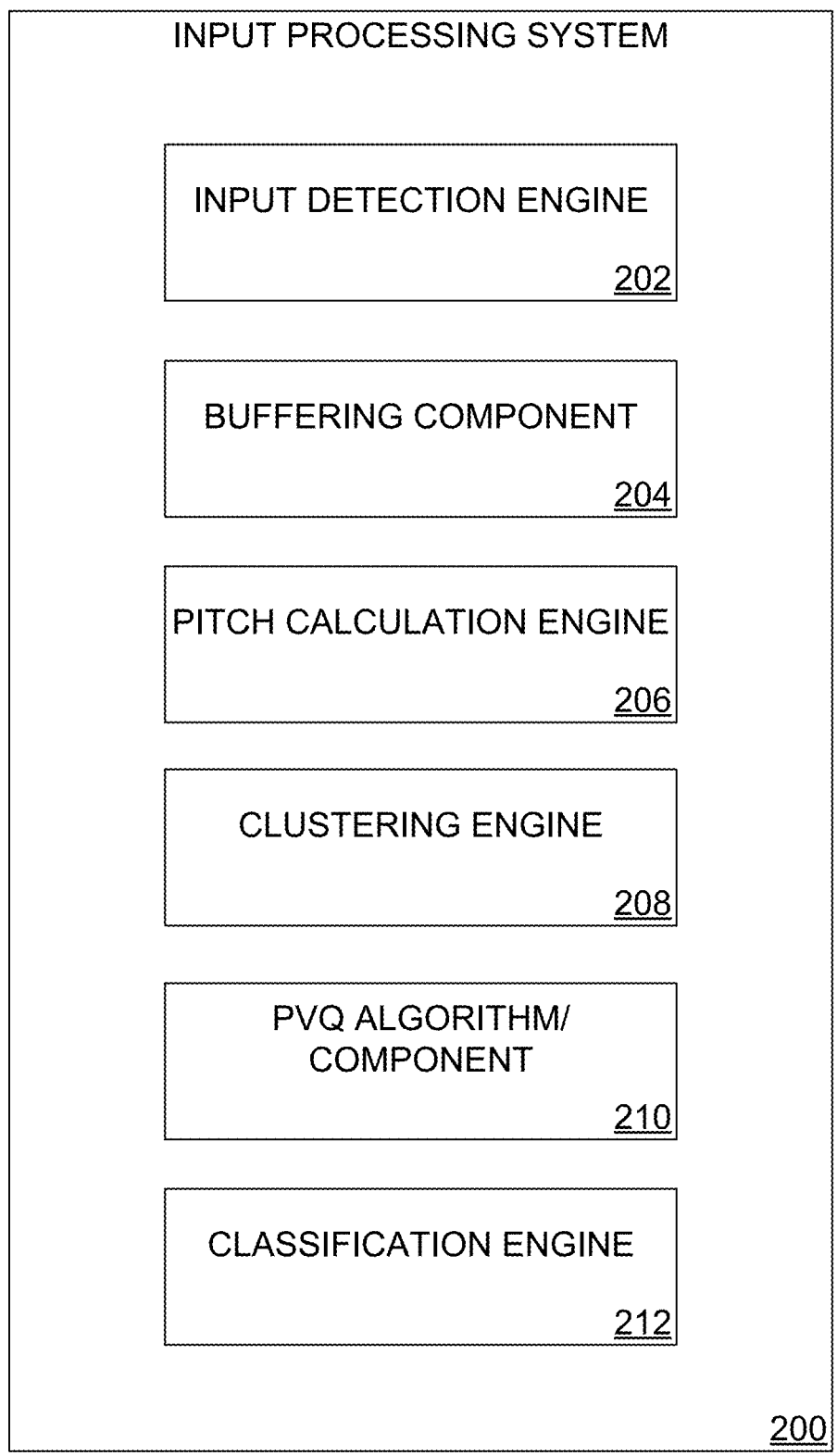
FIG. 2 illustrates an example input processing system for detecting monotone speech and providing real-time feedback as described herein.

FIG. 2 illustrates an example input processing system 200 for detecting monotone speech and providing real-time feedback as described herein. The speech detection techniques implemented by input processing system 200 may comprise the techniques and data described in system 100 of FIG. 1. In some examples, one or more components of input processing system 200 (or the functionality thereof) may be distributed across multiple devices. In other examples, a single device (comprising at least a processor and/or memory) may comprise the components of input processing system 200.

In aspects, input processing system 200 may comprise input detection engine 202, buffering component 204, pitch calculation engine 206, clustering engine 208, PVQ algorithm/component 210, and classification engine 212. Input detection engine 202. One of skill in the art will appreciate that the scale of input processing system 200 may vary and may include more or fewer components than those described in FIG. 2. For example, the functionality of pitch calculation engine 206, clustering engine 208, and/or PVQ algorithm/component 210 may be combined into a single component, model, or algorithm.

Input detection engine 202 may be configured to receive or detect input for one or more users or devices, such as computing devices 102A-D. The input may include at least audio data. In examples, the audio data may relate to speech data from a speaking session. The speech data may be received in real-time or as one or more portions (e.g., files, data chunks, etc.) of previously recorded speech. Upon receiving the input, input detection engine 202 may perform one or more preprocessing steps. The preprocessing steps may include, for example, parsing the input into one or more input types (e.g., audio data, video data, text data, etc.), identifying user/device identifiers (e.g., user/account name, device name/type, etc.), identifying entry point information (e.g., identify application or service used to collect the input), identifying date/time information, identifying input attributes (e.g., length of input, subject and/or content of input, etc.), storing and/or labeling the input, etc. Upon (or in lieu of) completing the preprocessing steps, input detection engine 202 may provide the audio data from the input (and/or the preprocessed input) to buffering component 204.

Buffering component 204 may be configured to buffer the audio data into one or more sliding time windows. Each of the sliding time windows may comprise a portion of the audio data that comprises the speaking session. As a specific example, each sliding time window may comprise a ten second portion of the audio data.

Pitch calculation engine 206 may be configured to calculate pitch values in the audio data. In examples, pitch calculation engine 206 may access the sliding time windows comprising the buffered audio data. Upon accessing a sliding time window, pitch calculation engine 206 may identify and/or extract one or more pitch values from the audio data. Using the pitch values, the pitch for one or more time frames comprised by the sliding time window may be calculated. As a specific example, pitch calculation engine 206 may calculate pitch for 30 millisecond time frame ("pitch time frame") within a ten second sliding time window. In some examples, the pitch time frames may overlap. For instance, a series of 30 millisecond pitch time frames may overlap by 10 milliseconds. After the pitch values for the various pitch time frames have been calculated, pitch calculation engine 206 may remove pitch values that are zero-valued (e.g., pitch value=0). The zero-valued pitch values may correspond to unvoiced pitch time frames (e.g., time frames in the sliding time window for which speech and/or sound was not detected). In some examples, pitch calculation engine 206 may apply one or more data smoothing techniques to the pitch values. The data smoothing techniques may remove or modify seemingly anomalous pitch values. An anomalous pitch value may refer to a pitch value that varies significantly from surrounding pitch values.

Clustering engine 208 may be configured to cluster the pitch values in the audio data. In examples, clustering engine 208 may use one or more data clustering strategies to divide the pitch values into one or more clusters. Clustering, as used herein, refers to a process of classifying data points/objects into one or more groups based on attribute similarities between the data points/objects. Example clustering techniques include, but are not limited to, centroid-based clustering (e.g., k-means clustering, k-medoids clustering, etc.), distribution-based clustering (e.g., Gaussian mixture model clustering, etc.), connectivity-based clustering (e.g., single-linkage clustering, unweighted pair group method with Arithmetic mean (UPGMA), etc.), density-based clustering (e.g., density-based spatial clustering of applications with noise (DBSCAN), ordering point to identify the clustering structure (OPTICS), etc.), and grid-based clustering (e.g., statistical information grid approach (STING), clustering in QUEst (CLIQUE), etc.).

PVQ algorithm/component 210 may be configured to compute PVQ for clustered pitch values. In examples, PVQ algorithm/component 210 may be provided access to the pitch value clusters generated by clustering engine 208. For each cluster, PVQ algorithm/component 210 may calculate the standard deviation of the values in the cluster and the mean of values in the cluster. The PVQ of the cluster may then be calculated by dividing the standard deviation by the mean. The PVQ of each cluster may be used to compute the weighted average of PVQ across the clusters. In examples, the weighted average of PVQ may provide for accurate monotone detection across different sexes or genders.

Classification engine 212 may be configured to classify audio data. In examples, classification engine 212 may compare the computed weighted average of PVQ against one or more threshold values. A threshold value may be predefined, configured by a user during or prior to the speaking session, or determined automatically by input processing system 200. As one example, a user may provide training data comprising sample speech to input processing system 200. The training data may be provided prior to the speaking session or at the beginning of the speaking session. Based on the training data, input processing system 200 may determine an expected pitch range for the user using the operations discussed above with respect to input detection engine 202, buffering component 204, pitch calculation engine 206, clustering engine 208, and/or PVQ algorithm/component 210. Classification engine 212 may set and/or adjust a pitch threshold for the user based on the expected pitch range.

Based on the comparison of the weighted average of PVQ to the threshold value, classification engine 212 may classify the audio data for a sliding time window as monotone (or non-monotone) speech. For example, if a weighted average of PVQ meets or exceeds a threshold value, the audio data may be classified as non-monotone speech. Upon classifying the audio data, classification engine 212 may generate a notification of the classification. The notification (or an indication thereof) may be provided to computing devices 102A-D in real-time. Alternately, the notification (or the indication thereof) may be displayed using an interface of input processing system 200. For instance, a visual, audio, or haptic notification may be provided for each sliding time window. In some aspects, classification engine 212 may store the classification for each sliding time window in the audio data. When the audio data is no longer being received or detected (e.g., the speaking session has concluded) and the audio data has been processed by input processing system 200, classification engine 212 may generate a notification or report. The notification/report may be provided to computing devices 102A-D and/or displayed using an interface of input processing system 200.

Having described various systems that may be employed by the aspects disclosed herein, this disclosure will now describe one or more methods that may be performed by various aspects of the disclosure. In aspects, methods 300-600 may be executed by an execution environment or a system such as system 100 of FIG. 1 or input processing system 200 of FIG. 2. However, methods 300-600 is not limited to such examples. In other aspects, methods 300-600 may be performed by a single device comprising an application or service providing monotone speech detection and/or other speech-based analysis. In at least one aspect, methods 300-600 may be executed (e.g., computer-implemented operations) by one or more components of a distributed network, such as a web service/distributed network service (e.g. cloud service).

Figure 3:
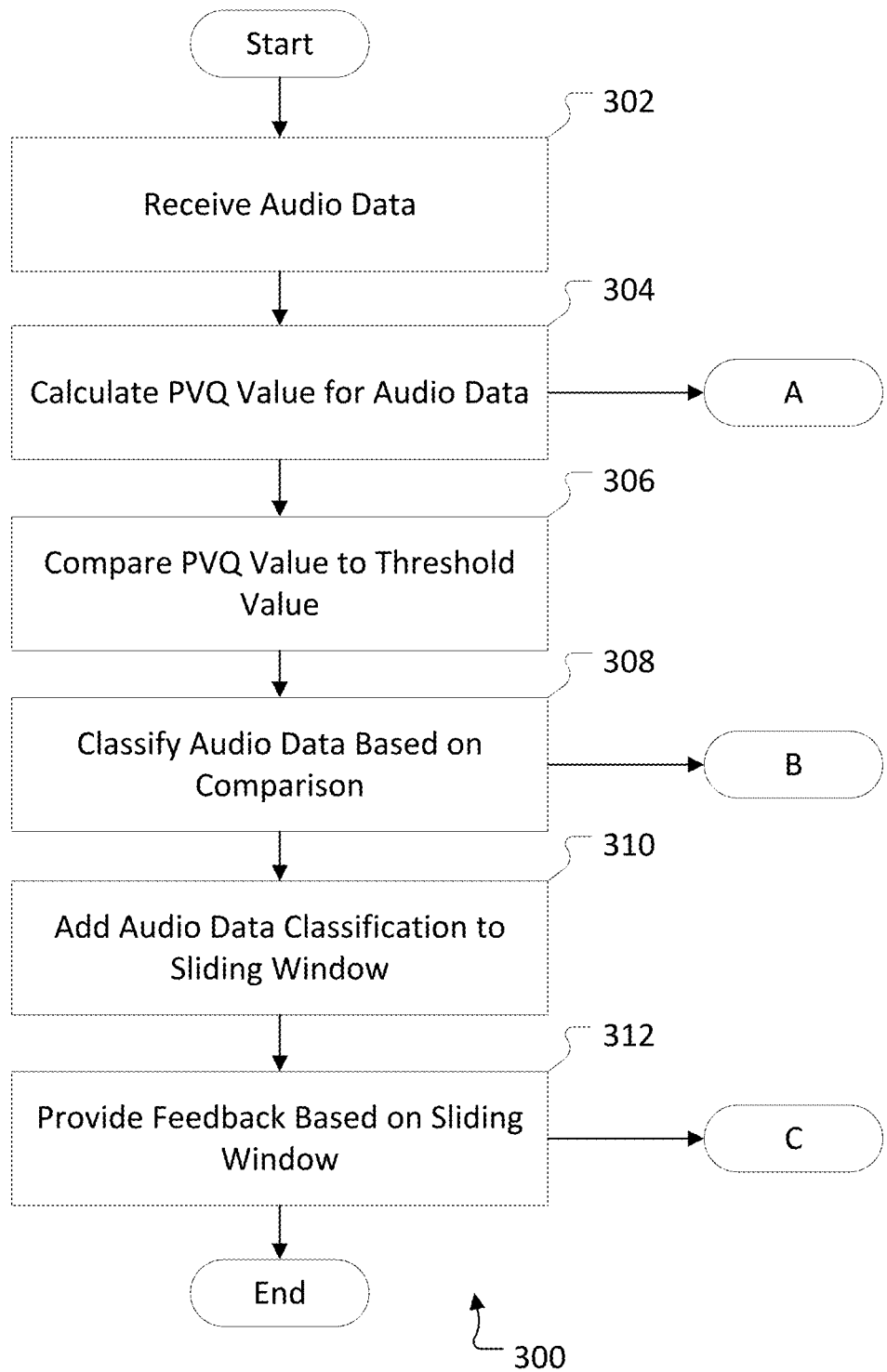
FIG. 3 illustrates an example method for detecting monotone speech and providing real-time feedback as described herein.

FIG. 3 illustrates an example method 300 for detecting monotone speech and providing real-time feedback. Example method 300 begins at operation 302, where audio data is received. In aspects, audio data may be received by a speech evaluation utility (e.g., service, application, module, etc.). The audio data may represent speech data collected during a speaking session of a user. The audio data may be received in real-time or may be previously recorded. Upon receiving the audio data, an input detection and/or processing component, such as input detection engine 202, may perform processing on the audio data. For example, the audio data may be processed to identify a user or user device, audio attributes, an entry point, etc. The information identified during processing may be added to (or otherwise associated with) the audio data and/or stored with the audio data.

At operation 304, a PVQ value may be calculated for the audio data. In aspects, a buffering component, such as buffering component 204, may buffer the received audio data into one or more sliding time windows. As a specific example, the audio data may be buffered into ten second sliding time windows. Pitch values for the audio data in each sliding time window may be calculated using a digital audio utility, such as pitch calculation engine 206. The pitch values may be clustered into one or more pitch value clusters, using a clustering component, such as clustering engine 208. A PVQ calculation component, such as PVQ algorithm/component 210, may be used to calculate a PVQ for each cluster. The PVQ for each cluster may be used to estimate a weighted average of PVQ across all of (or a portion of) the clusters for a respective sliding time window. In some aspects, the steps performed at operation 304 may be performed using a single component or fewer components than described above. For example, the buffered audio data may be provided as input to a single algorithm. The algorithm may output a PVQ for the corresponding sliding time window. In such an example, the algorithm may be used to calculate PVQ for audio data in overlapping sliding time windows. For instance, the algorithm may be executed every five seconds for the last ten seconds of audio data received.

At operation 306, the weighted average of PVQ may be compared to a threshold value. In aspects, one or more thresholds may be defined. A threshold may be predefined (e.g., hard-coded into software, set by a system administrator or manager, etc.), configured by a user during or prior to the speaking session, or determined automatically by the speech evaluation utility. A threshold may represent a limit that separates two or more PVQ ranges. For example, a default PVQ threshold of 0.15 may be defined. PVQ values that are below the threshold may represent monotone speech, whereas PVQ values that meet or exceed the threshold may represent non-monotone speech. In another example, a PVQ threshold of 0.17 may be defined for a ten second sliding time window comprising PVQ values ranging from 0.05 to 0.50. In yet another example, a first PVQ threshold of 0.20 and a second PVQ threshold of 0.25 may be defined for a ten minute speaking session comprising mean PVQ values ranging from 0.18 to 0.33. PVQ values that are below the first threshold may represent monotone speech, PVQ values that are between the first threshold and the second threshold may represent normal mon-monotone speech, and PVQ values that exceed the second threshold may represent lively/engaging mon-monotone speech.

In aspects, a classification component, such as classification engine 212, may compare the weighted average of PVQ for a sliding time window to a threshold value. Based on the comparison, the classification component may assign one or more classifications to the audio data for a sliding time window. For example, the audio data may be classified as monotone, non-monotone, lively, etc. Upon assigning the classification to the audio data, classification engine 212 may generate a notification of the classification. In examples, the notification of the classification may be provided to a user in real-time (e.g., while the speaking session is ongoing).

At operation 310, an audio data classification may be stored. In aspects, the classification component may store the audio data classification for each sliding time window. The classifications may be stored for the duration of the speaking session in a memory space accessible to the speech evaluation utility, in one or more files, in a data store, etc. In a particular example, an audio data classification may be added to a sliding window comprising the audio data classifications for the previous three sliding time windows. Storing and/or aggregating the classifications may improve the overall precision of classifying monotone and non-monotone speech by reducing the volatility of the PVQ metric.

At operation 312, feedback for the audio data may be provided. In aspects, the classification component may monitor and/or collect data and statistics relating to the audio data for the duration of the audio data. When the audio data is no longer being received or detected (e.g., the speaking session has concluded), the classification component may use the collected data and statistics to generate summary feedback (e.g., a report, an analysis, a critique, etc.). The summary feedback may be provided to the user. In examples, the summary feedback may enable the user to improve the user's public speaking skills and knowledge.

Figure 4:
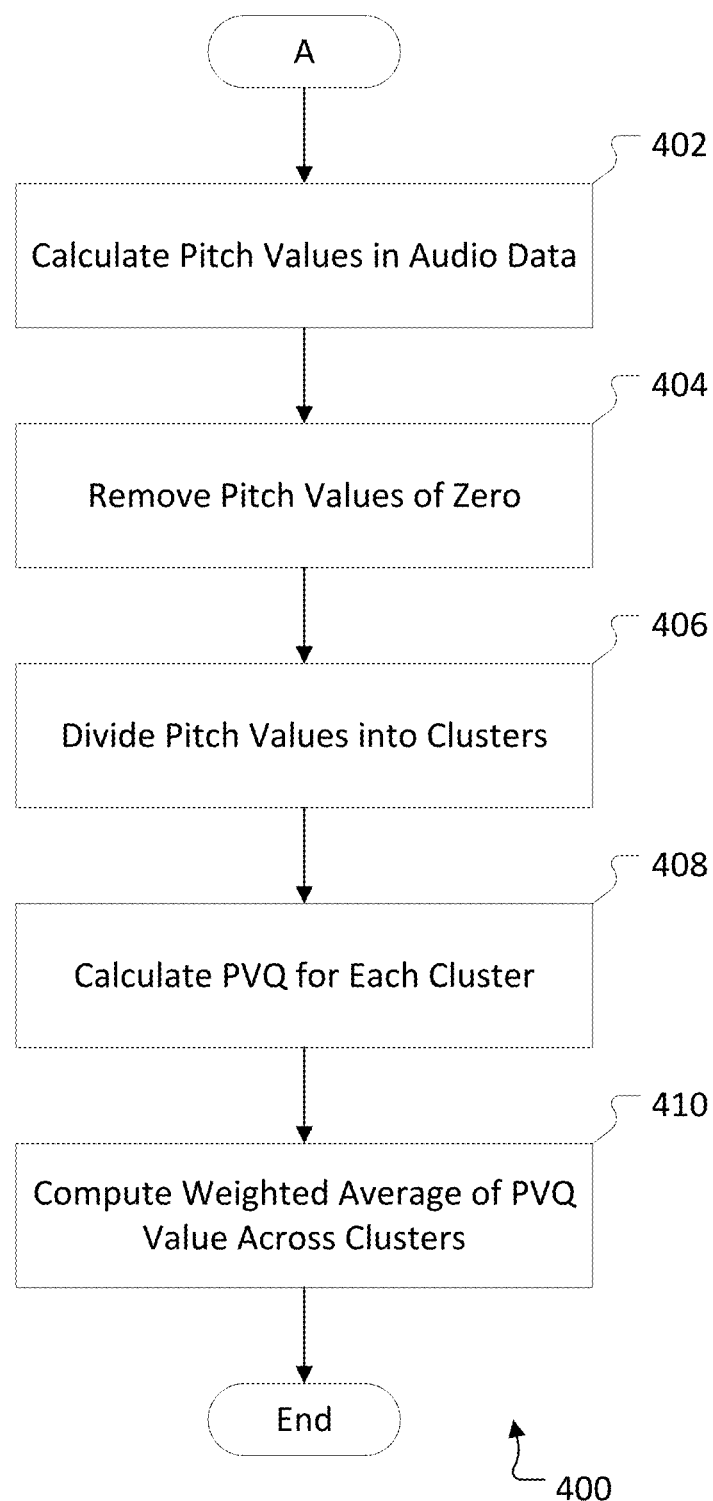
FIG. 4 illustrates an example method for calculating Pitch Variation Quotient (PVQ) for audio data as described herein.

FIG. 4 illustrates an example method for calculating Pitch Variation Quotient (PVQ) for audio data as described herein. Example method 400 begins at operation 402, where pitch values are calculated. In aspects, a sliding time window comprising audio data may be accessed. The audio data may comprise speech data for a user currently engaging in a speaking session. A digital audio utility, such as pitch calculation engine 206 or one or more audio library files, may be used to identify and/or extract pitch values from the audio data. In examples, the pitch value for one or time frames comprised by the sliding time window may be calculated. For instance, pitch values may be calculated for 30 millisecond time frames within a sliding time window. The time frames may be arranged chronologically such that the time frames represent a moving window of speech. In at least one example, the time frames may be arranged such that the time frames overlap. For instance, a series of 30 millisecond time frames may overlap by 10 milliseconds.

In some aspects, one or more data smoothing techniques may be applied to the pitch values of the time frames. The data smoothing techniques may remove or modify seemingly anomalous pitch values to prevent or mitigate erratic notification behavior. For instance, the following pitch frequency values may be calculated for a series of consecutive time frames: 95 Hz, 100 Hz, 95 Hz, 250 HZ, 90 Hz, 90 Hz, 100 Hz. Data smoothing logic may identify that the pitch frequency value 250 Hz is outside of an acceptable standard deviation of the other pitch frequency values. As a result, the data smoothing logic may remove the pitch frequency value 250 Hz. Alternately, the data smoothing logic may assign an alternate value to the pitch frequency value 250 Hz. As a specific example, the pitch frequency value 250 Hz may be omitted and the mean of the series of pitch frequency values (i.e., 95 Hz) may be used to replace the pitch frequency value 250 Hz. The At operation 404, pitch values of zero may be removed. In aspects, pitch values of zero may be identified in the sliding time window. The pitch values of zero may correspond to unvoiced time frames (e.g., time frames for which speech and/or sound was not detected or has been removed). The times frames corresponding to the pitch values of zero ("zero-valued time frames") may be removed from the sliding time frame. As a result of removing a zero-valued time frame, time frames of the sliding time window may be rearranged such that the time frame immediately preceding the zero-valued time frame is chronologically adjacent to the time frame immediately succeeding the zero-valued time frame.

At operation 406, pitch values may be divided into clusters. In aspects, one or more clustering techniques may be used to group the pitch values into one or more clusters. Example clustering techniques include centroid-based clustering, distribution-based clustering, connectivity-based clustering, density-based clustering, and grid-based clustering. As a specific example, a k-means clustering algorithm may be used to cluster the non-zero pitch values into a two clusters. k-means clustering, as used herein, refers to a method of vector quantization that partitions n observations into k clusters in which each observation belongs to the cluster with the nearest mean.

At operation 408, a PVQ may be calculated for each cluster. In aspects, for each cluster, the standard deviation of the pitch values in the cluster and the mean of the pitch values in the cluster may be calculated. The standard deviation may be divided by the mean to calculate the PVQ of the respective cluster. For example the PVQ of a single cluster may be represented by the following equation:

$$PVQ_n = n\frac{\sigma}{\mu}.$$

In the above equation, $PVQ_n$ denotes the PVQ of the cluster, n denotes the weighted factor for the cluster, a denotes the standard deviation of pitch values in the cluster, and p denotes the mean of the pitch values in the cluster. Accordingly, continuing from the above example, the twos clusters generated using k-means clustering may be represented as $PVQ_1$ and $PVQ_2$. Although specific values and equations are described, it is contemplated that alternate values and/or equations may be used.

At operation 410, a weighted average of PVQ across all of the clusters may be calculated. In aspects, the PVQ for each cluster may be used to compute the weighted average of PVQ across the clusters. For instance, continuing from the above example, the weighted average of PVQ for the two clusters may be represented by the following equation:

$$PVQ_{WA} = \frac{n_1 \frac{\sigma_1}{\mu_1} + n_2 \frac{\sigma_2}{\mu_2}}{n_1 + n_2}.$$

In the above equation, $PVQ_{WA}$ denotes the weighted average of PVQ across the two clusters, $n_1$ denotes the weighted factor for cluster 1, $\sigma_1$ denotes the standard deviation of pitch values in cluster 1, $\mu_1$ denotes the mean of the pitch values in cluster 1, $n_2$ denotes the weighted factor for cluster 2, $\sigma_2$ denotes the standard deviation of pitch values in cluster 2, and $\mu_2$ denotes the mean of the pitch values in cluster 2. Although specific values and equations are described, it is contemplated that alternate values and/or equations may be used.

Figure 5:
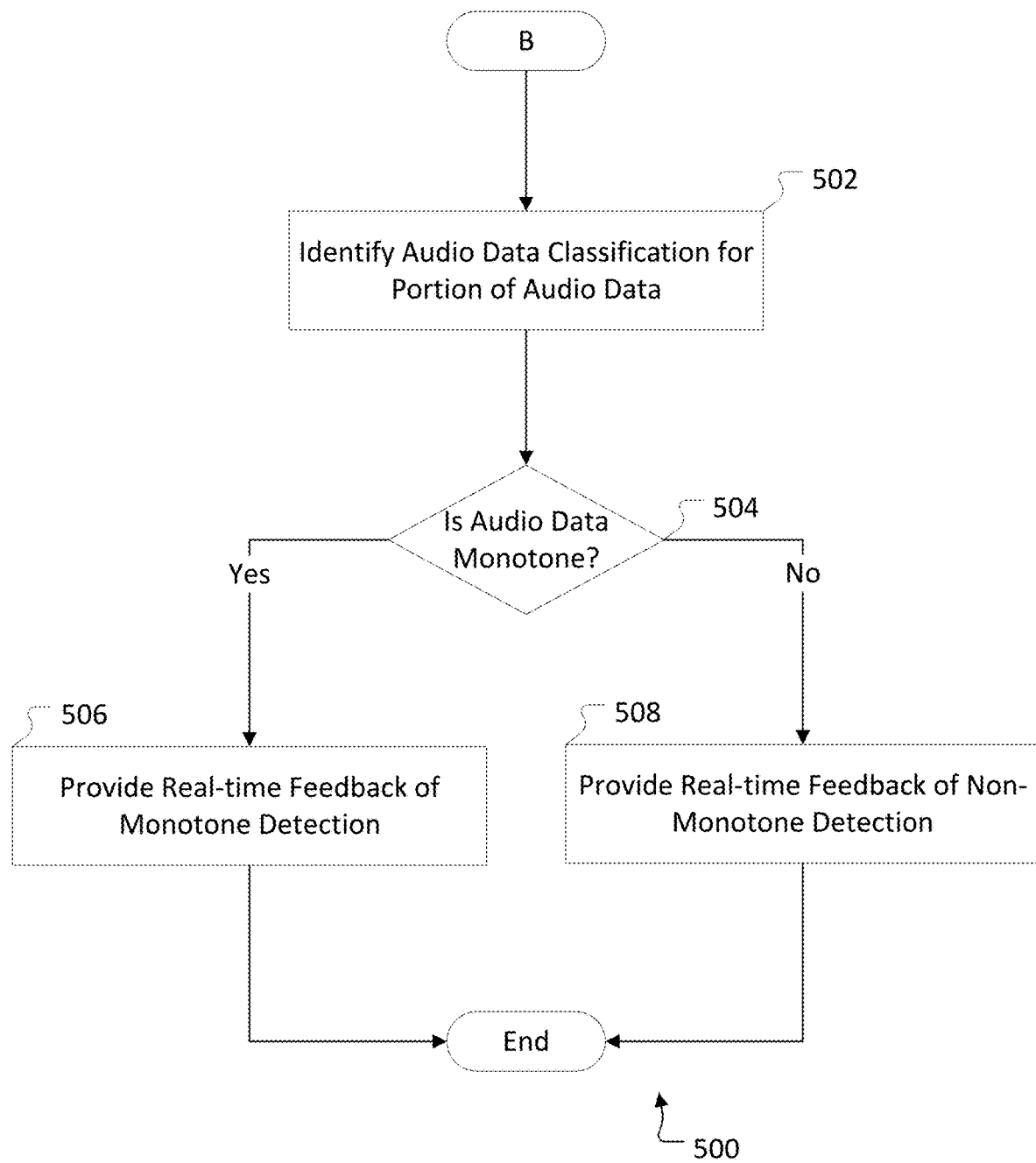
FIG. 5 illustrates an example method for providing real-time feedback for one or more portions of an audio data session as described herein.
Figure 7A:
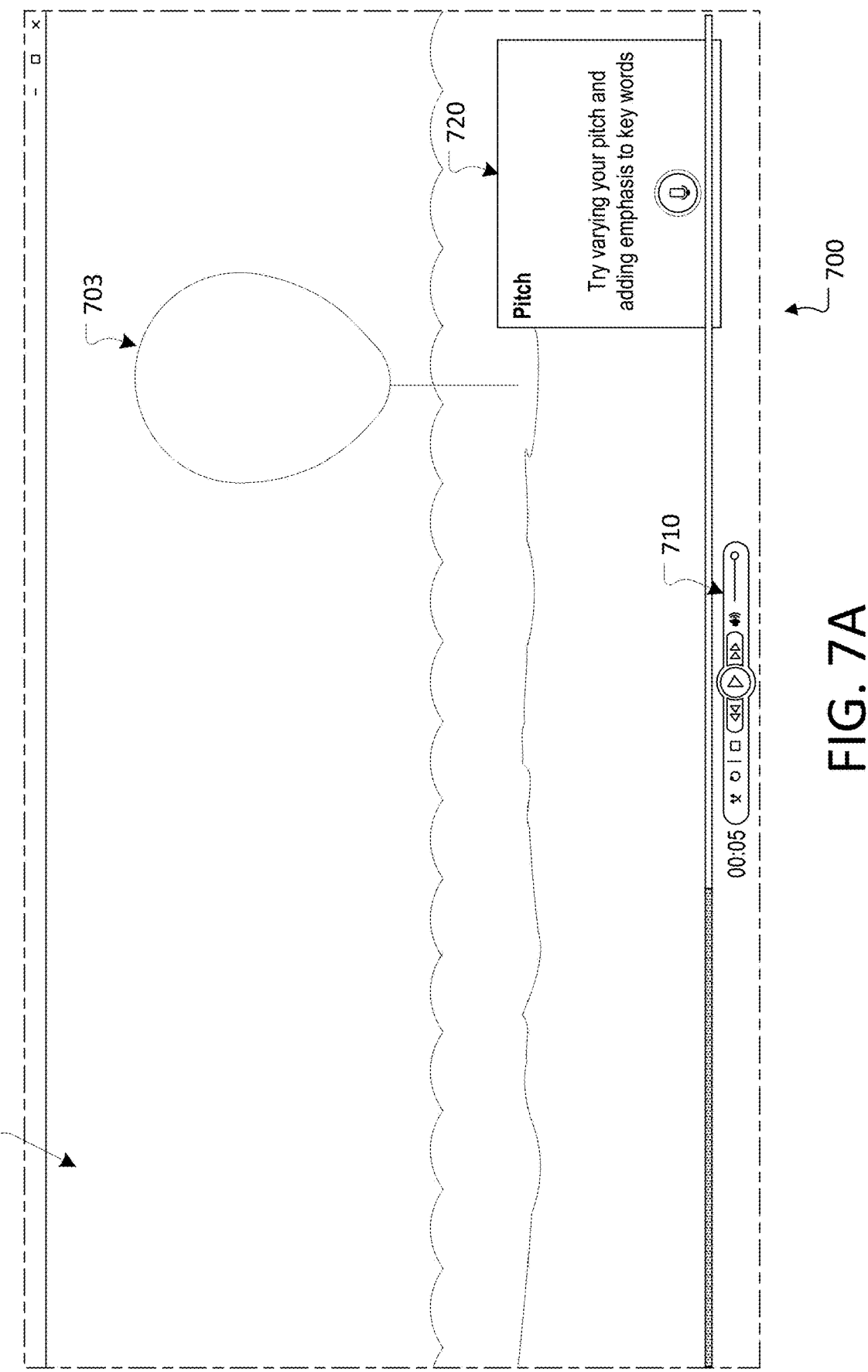
FIGS. 7A and 7B are diagrams of an interface for providing real-time pitch variation feedback to a speaker.

FIG. 5 illustrates an example method for providing real-time feedback for one or more portions of an audio data session as described herein. Example method 500 begins at operation 502, where an audio data classification is identified. In aspects, audio data in a sliding time window may be classified according to a weighted average of PVQ calculated for the sliding time window, as described in FIGS. 3 and 4. Examples of classifications include, but are not limited to, monotone, non-monotone, lively, etc. In other examples, the classifications may be numerical. For instance, a classification may be a value selected from a range of values between 1 and 100, such that lower values indicate monotone speech and higher values indicate non-monotone and/or engaging speech. A classification may be identified by a classification component, such as classification engine 212, using one or more parsing and/or search techniques, such as regular expressions, fuzzy logic, or a pattern recognition model/equation At decision operation 504, a determination is made regarding whether a classification indicates audio data is considered monotone or non-monotone. In aspects, if it determined that the audio data is considered monotone, method 500 proceeds to operation 506. At operation 506, real-time feedback of monotone speech detection may be provided. In examples, an indication that the audio data is classified as monotone may be generated and provided to, and/or presented by, one or more user devices. The indication may be visual, audio, haptic, or any other type of indication. The indication may be presented using an interface of a user device. As a specific example, FIG. 7A illustrates an interface 700 for providing real-time pitch variation feedback to a speaker during a speaking session. Interface 700 comprises background 702, media control panel 710, and monotone speech indication 720.

In examples, background 702 may comprise one or more objects (e.g., images, animations, controls, etc.). Background 702 and the objects therein may be visible to the speaker during a speaking session. In some examples, one or more objects in background 702 may be repositioned or be altered during the speaking session. For instance, background object 703 may move in one or more directions and/or background 702 may scroll during the speaking session. In at least one example, the objects in background 702 may be react in real-time to the received audio data. For instance, background object 703 may float higher or lower, become larger or smaller, etc. in real-time based on the characteristics/properties of received audio data, such as PVQ classification/rating, speaker tempo, speaker volume, etc.

Media control panel 710 may enable a speaker to record audio data, pause a recording, playback a recording, or otherwise manipulate the audio data/recording. Media control panel 710 may also provide additional controls, such as a timer component, a recording state component (e.g., recording in progress, recording paused, etc.), volume controls, and the like. In some examples, media control panel 710 may comprise controls for modifying properties of background 702 and/or monotone speech indication 720. As one example, media control panel 710 may be used to select an alternate background and/or background objects. As another example, media control panel 710 may be used to modify the placement, style and/or content of monotone speech indication 720.

Monotone speech indication 720 may provide a message, alert, or other notification that monotone speech has been detected for received audio data. Monotone speech indication 720 may be provided in real-time based on one or time intervals (e.g., every 5 or 10 seconds), one or more detection criteria (e.g., upon detecting monotone, non-monotone speech, a pause of a certain length by the speaker, etc.), explicit user request (e.g., in response to a user-provide keyword or key phrase, user selection of a control/option, etc.), or the like. In examples, monotone speech indication 720 may comprise various fonts, styles, emphasis tools (e.g., highlighting, circling/boxing, etc.), images, animations, etc. In the specific example illustrated in FIG. 7A, monotone speech indication 720 notifies the user at "00:05" of the speaking session that the detected audio data is monotone by providing the notification "Try varying your pitch and adding emphasis to key words."

Figure 7B:
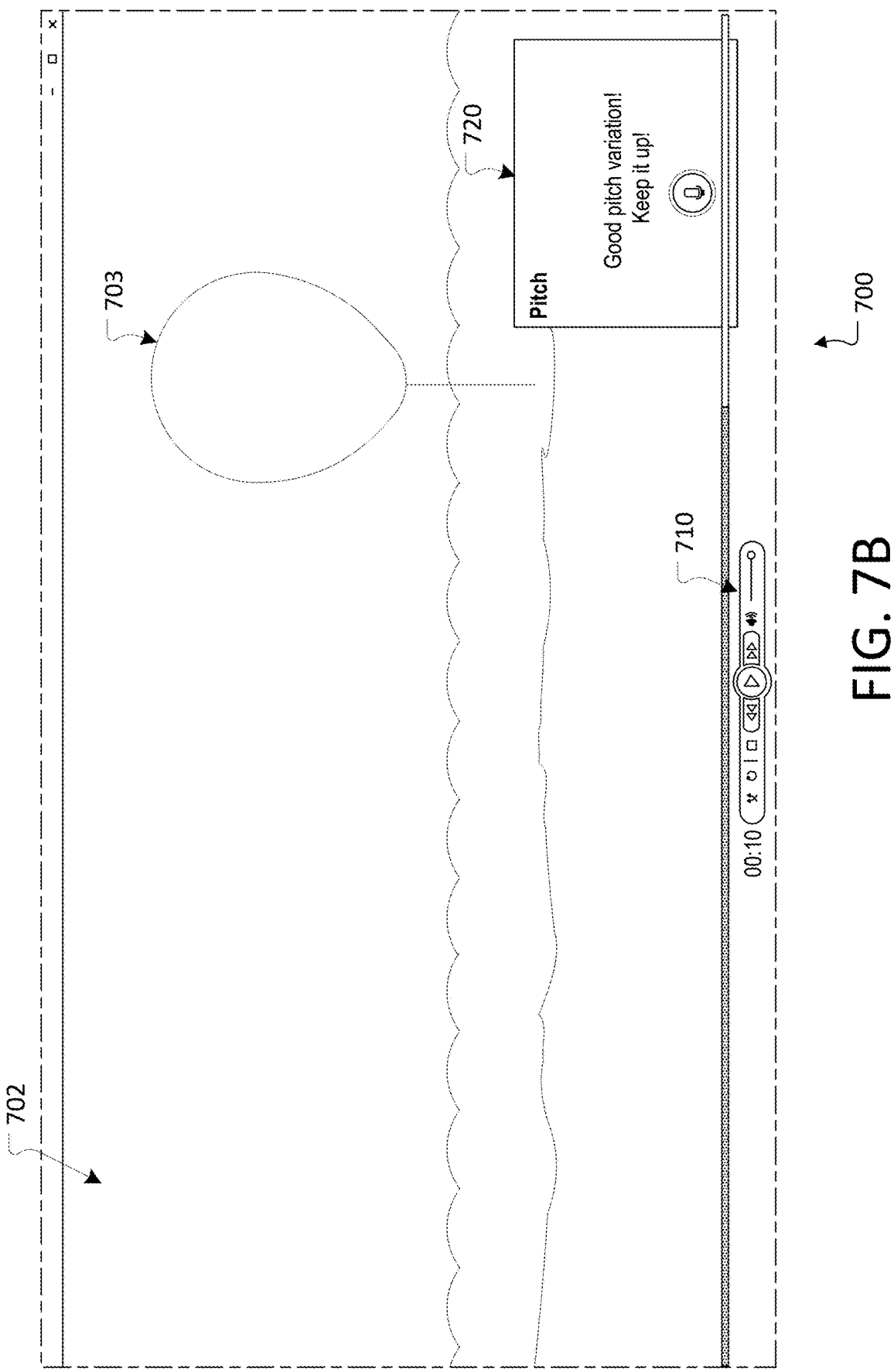

In aspects, if it determined that the audio data is considered non-monotone, method 500 proceeds to operation 508. At operation 508, real-time feedback of non-monotone speech detection may be provided. In examples, an indication that the audio data is classified as non-monotone may be generated and provided to, and/or presented by, one or more user devices. The indication may be presented to a speaker in real-time using interface 700, as described in operation 506. As a specific example, FIG. 7B illustrates interface 700 of FIG. 7A. As shown, monotone speech indication 708 notifies the user at "00:10" of the speaking session that the detected audio data is non-monotone by providing the notification "Good pitch variation! Keep it up!"

Figure 6:
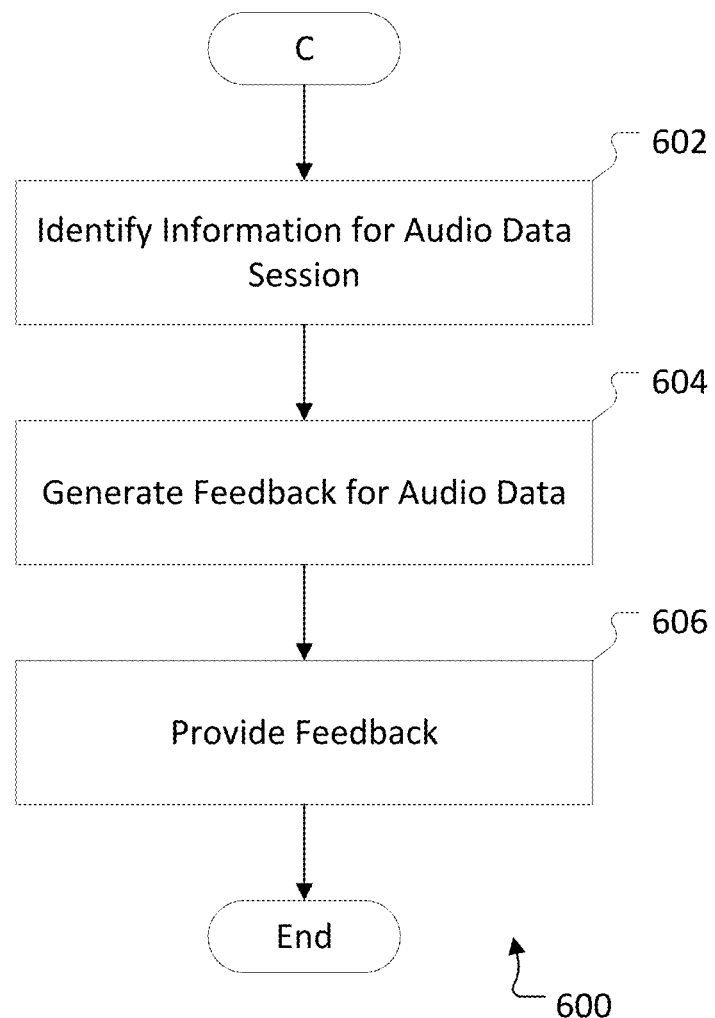
FIG. 6 illustrates an example method for providing real-time feedback for a completed audio data session as described herein.

FIG. 6 illustrates an example method for providing real-time feedback for a completed audio data session as described herein. Example method 600 begins at operation 602, where information for an audio data session is identified. In aspects, a component, such as classification engine 212, may monitor and/or collect information (e.g., data and statistics) relating to received audio data. The audio data may correspond to speech and/or sounds received during a currently completed speaking session. The information may include, for example, the length of the audio data, the number of objects (e.g., slides, pages, documents, etc.) rehearsed, sentence/word counts, prosody data (e.g., meter, rhythm, tempo, pitch, loudness data, etc.), and the like.

At operation 604, a feedback for the audio data may be generated. In examples, the information may be used to generate feedback (e.g., a report, an analysis, a critique, etc.) for the speaker. The feedback may comprise, for example, a summary of the audio data session, a grammar analysis (e.g., analysis of originality, sensitive phrases, sentence/word complexity, use of fillers, active/passive voice, etc.), a prosody analysis, overall pitch/PVQ analysis, segmented pitch/PVQ analysis (e.g., pitch/PVQ per sliding time window), etc. The feedback may also comprise user information for a speaker, such as a speaker and/or user device identifier, historical speaking session data, speaker-specific lesson/course planning information, etc.

Figure 8:
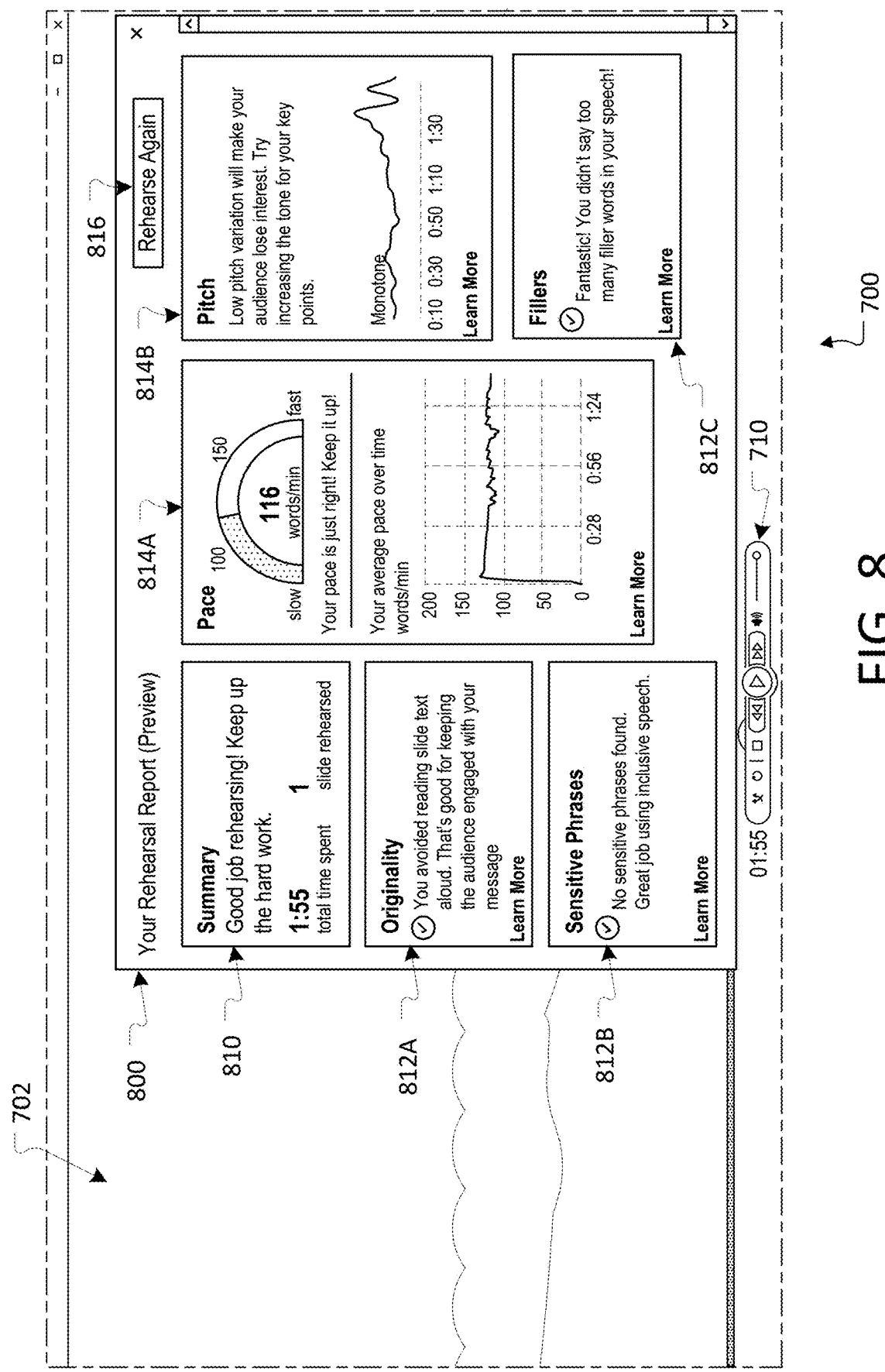
FIG. 8 is a diagram of an interface comprising a speaker feedback report for an audio data session.

At operation 606, the feedback may be provided/presented. In aspects, the feedback may be presented using an interface of a user device. As a specific example, FIG. 8 illustrates report 800 presented via interface 700 of FIGS. 7A and 7B. Report 800 comprises summary 810, grammar statistics 812 A-C, prosody statistics 814 A-B, and session initiation control 816. One of skill in the art will appreciate that report 800 may include more or fewer components than those described in FIG. 8.

As shown in FIG. 8, summary 810 comprises an overall analysis of the audio data session, the total time elapsed during the audio data session, and the content rehearsed. Grammar statistics 812 A-C may provide analysis relating to the originality expressed in the audio data, and the use of sensitive phrases and fillers in the audio data. Grammar statistics 812 A-C may also provide a mechanism for reviewing additional analysis or content for respective analysis categories. For instance, grammar statistics 812A comprises a "Learn More" link. When selected, the "Learn More" link may expand grammar statistics 812A to include additional content. Alternately, the "Learn More" link may cause a separate window comprising originality tips/advice to be displayed.

Prosody statistics 814 A-B may provide analysis relating to meter, rhythm, tempo, pitch, and/or loudness of the audio data. For example, prosody statistics 814A comprises an analysis of pace during the audio data session. The analysis of pace includes a visualization of the overall words per minute and a visualization of the average pace over the audio data session. As another example, prosody statistics 814B comprises an analysis of pitch during the audio data session. The analysis of pitch includes advice, a visualization of the average pitch over the audio data session, and a threshold indication for monotone speech.

Session initiation control 816 may enable a speaker to (re)initiate an audio data session. For instance, session initiation control 816 may cause media control panel 710 to begin recording audio data for a new speaking session. In examples, session initiation control 816 may be associated with one or more entry points such that selecting session initiation control 816 causes an entry point to be opened, installed, or made active. For instance, when selected, session initiation control 816 may cause a presentation application window to be active (e.g., displayed in the foreground). In some examples, when selected, session initiation control 816 may cause report 800 (and/or the associated data) to be stored, transmitted, and/or deleted.

FIGS. 9-12 and the associated descriptions provide a discussion of a variety of operating environments in which aspects of the disclosure may be practiced. However, the devices and systems illustrated and discussed with respect to FIGS. 9-12 are for purposes of example and illustration and are not limiting of a vast number of computing device configurations that may be utilized for practicing aspects of the disclosure, described herein.

Figure 9:
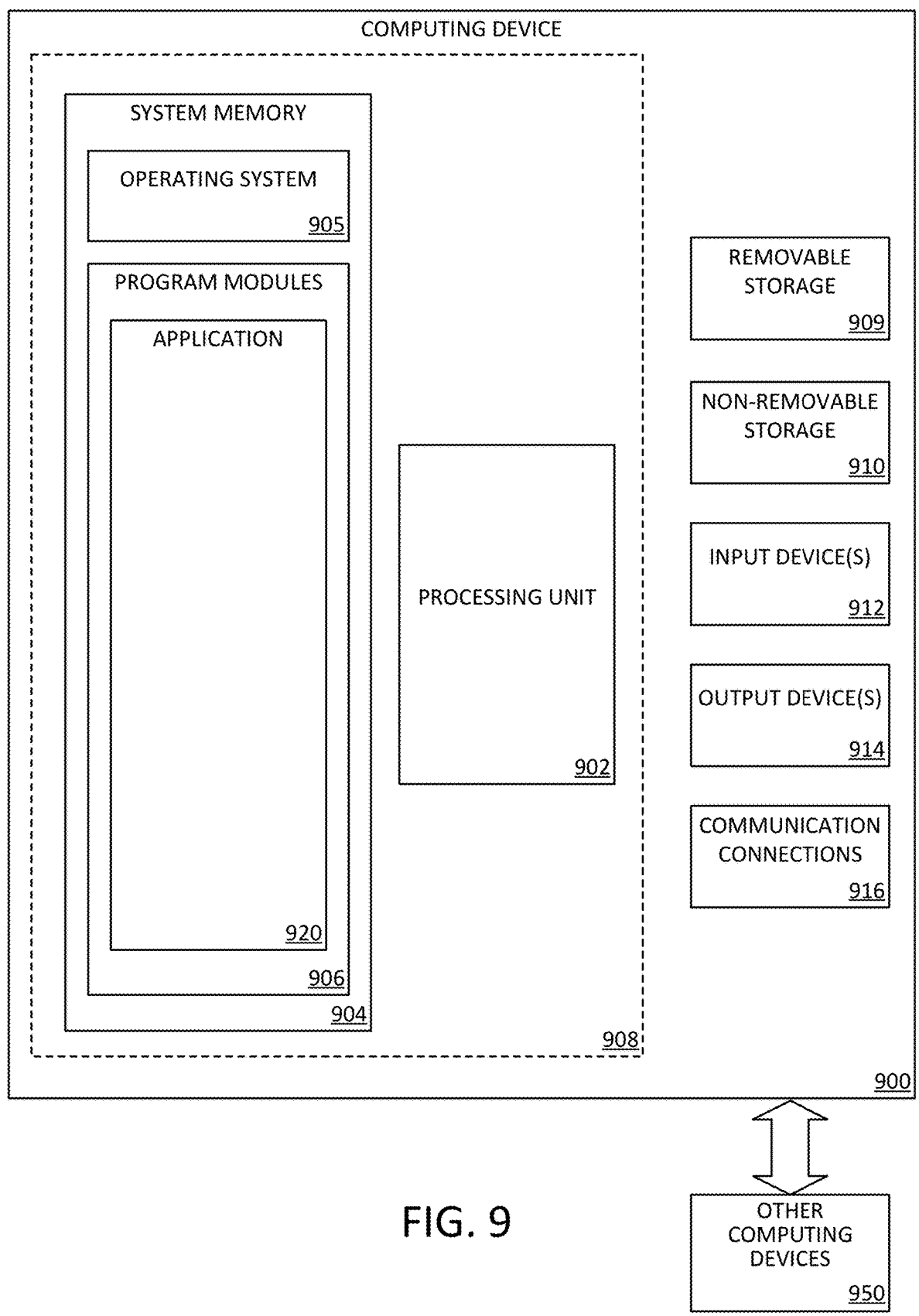
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may be suitable for the computing devices and systems described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more components supported by the systems described herein. The operating system 905, for example, may be suitable for controlling the operation of the computing device 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
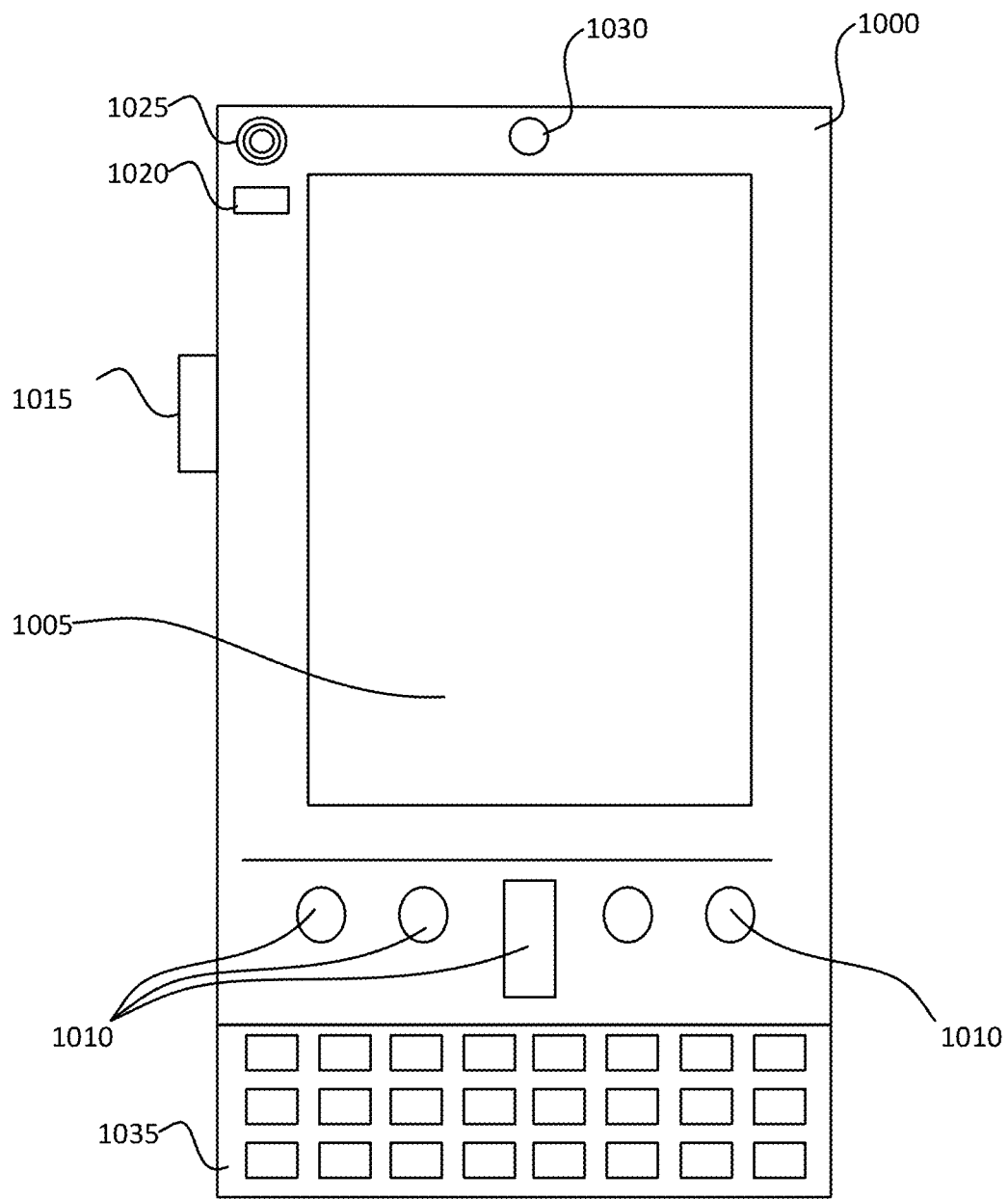
FIGS. 10A and 10B are simplified block diagrams of a mobile computing device with which aspects of the present disclosure may be practiced.
Figure 10B:
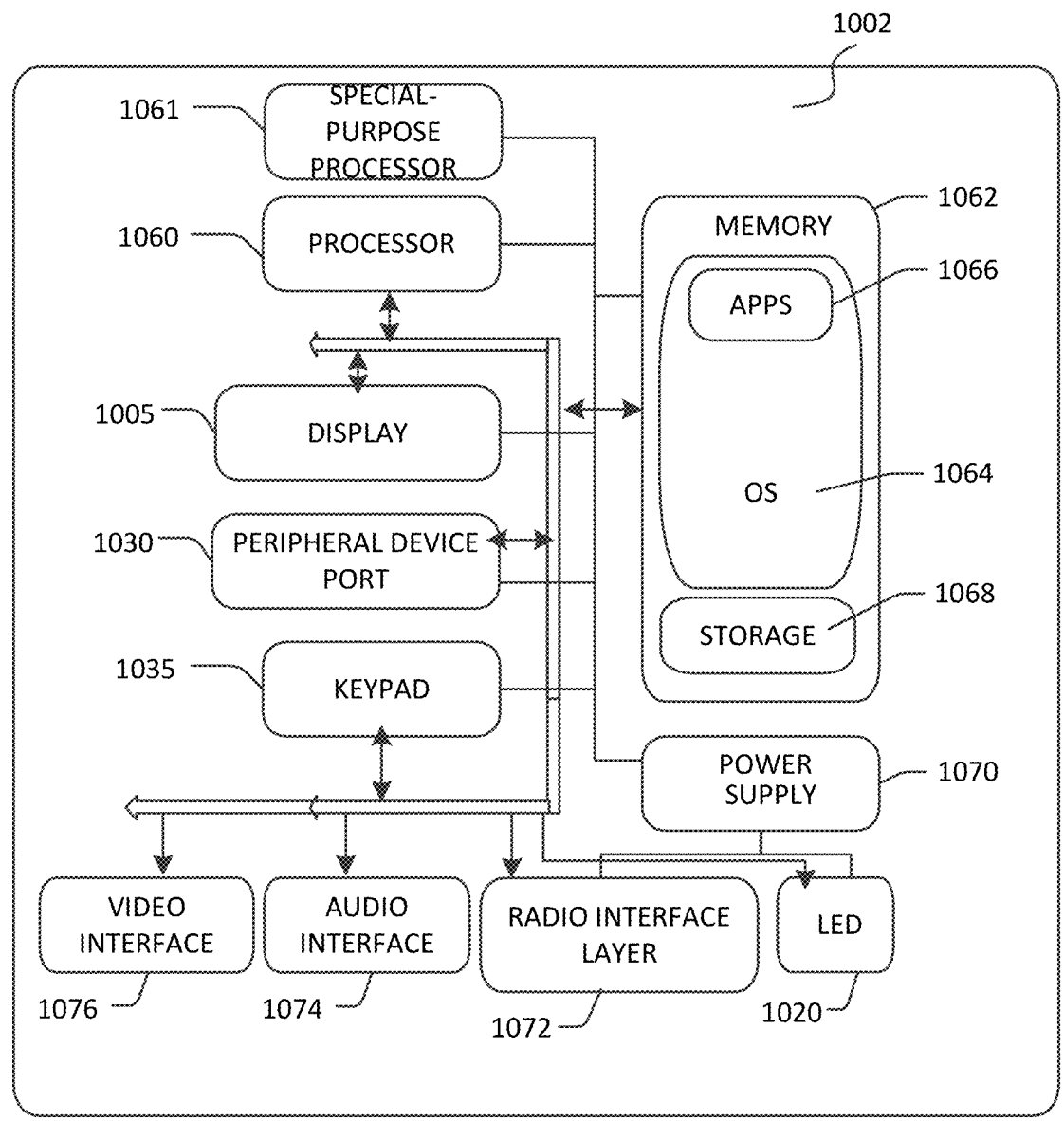

FIGS. 10A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display).

If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments.

In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display.

In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
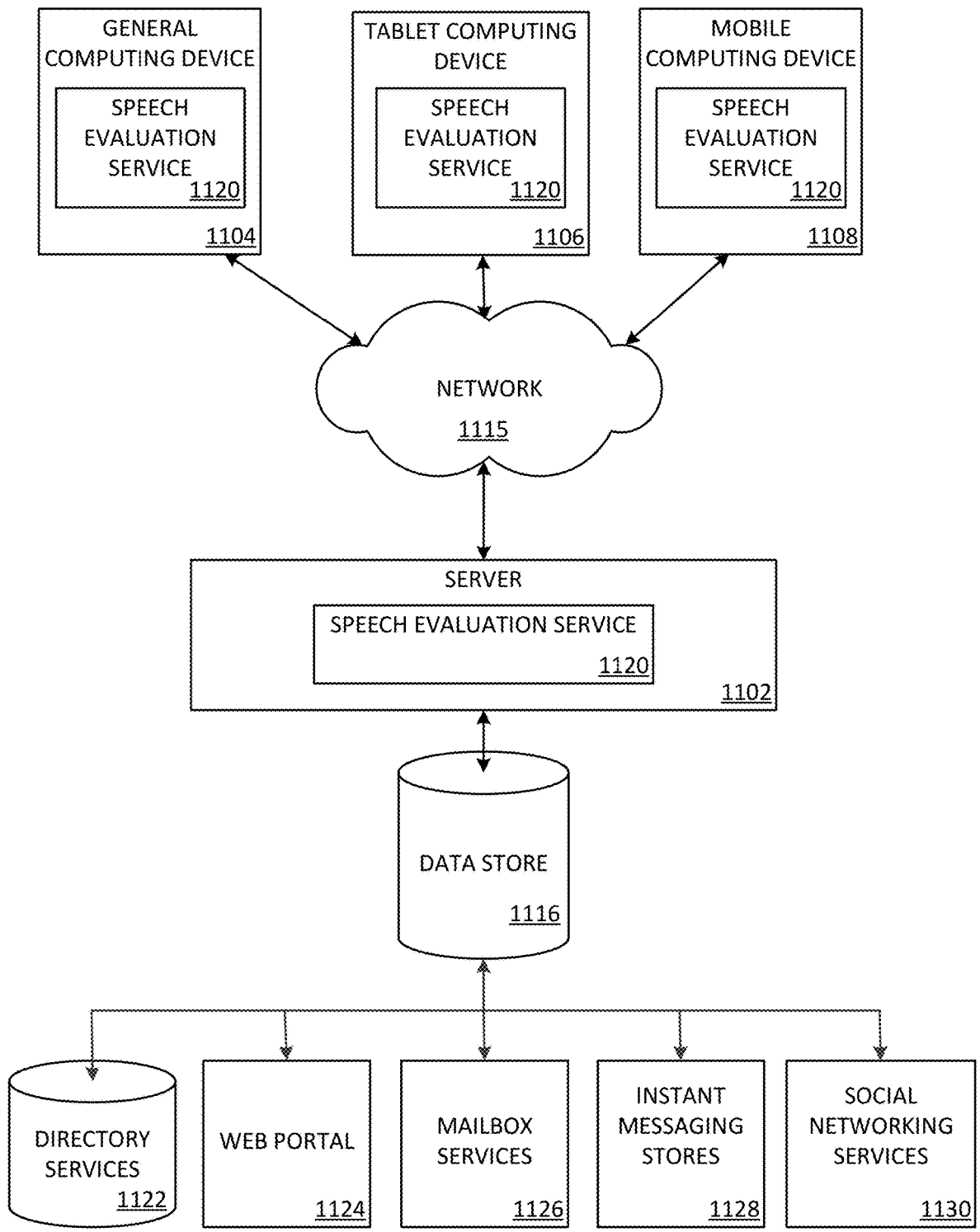
FIG. 11 is a simplified block diagram of a distributed computing system in which aspects of the present disclosure may be practiced.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130.

A speech evaluation service 1120 may be employed by a client that communicates with server device 1102, and/or speech evaluation service 1120 may be employed by server device 1102. The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Figure 12:
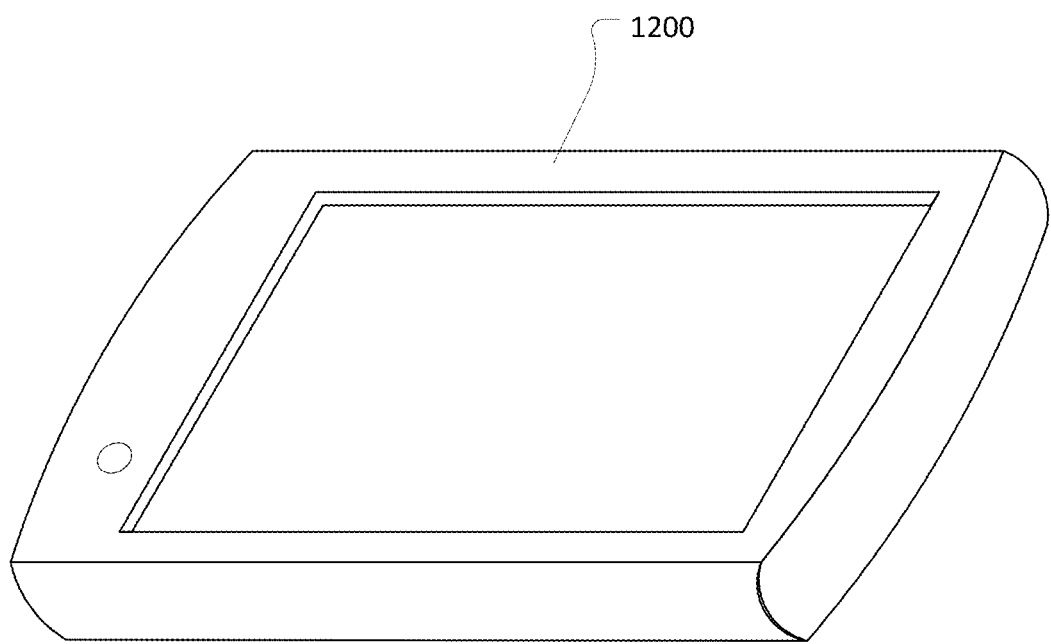
FIG. 12 illustrates a tablet computing device for executing one or more aspects of the present disclosure.

FIG. 12 illustrates an exemplary tablet computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory coupled to the processor, the memory comprising computer executable instructions that, when executed by the processor, performs a method comprising:
receiving, by a speech processing mechanism of the system, audio data during a real-time speaking session;
calculating a first set of pitch values for the audio data;
removing, by the speech processing mechanism, pitch values of zero from the set of pitch values to generate a second set of pitch values;
dividing the second set of pitch values into a first cluster and a second cluster;
calculating, by the speech processing mechanism, a first pitch variation quotient (PVQ) for the first cluster and a second cluster PVQ for the second cluster;
computing a weighted average PVQ using the first PVQ and the second PVQ, wherein the computing comprises:
multiplying a first weighted factor by the first PVQ to generate a first value:
multiplying a second weighted factor by the second PVQ to generate a second value; and
dividing a sum of the first value and the second value by a sum of the first weighted factor and the second weighted factor; and
generating, during the speaking session, a classification for the audio data based on the weighted average PVQ, wherein the classification indicates the audio data is at least one of: monotone or non-monotone.

2. The system of claim 1, wherein:
receiving audio data comprises buffering the audio data into one or more sliding time windows; and
calculating the first set of pitch values comprises calculating pitch values for each of the one or more sliding time windows.

3. The system of claim 1, wherein calculating the first set of pitch values comprises using data smoothing logic to remove anomalous pitch values from the first set of pitch values.

4. The system of claim 1, wherein dividing the second set of pitch values into the first cluster and the second cluster comprises applying k-means clustering to the second set of pitch values.

5. The system of claim 1, wherein calculating the first PVQ comprises:
calculating a standard deviation of pitch values for the first cluster;
calculating a mean of pitch values for the first cluster;
dividing the standard deviation by the mean to calculate the first PVQ.

6. The system of claim 2, wherein generating the classification for the audio data comprises:
generating an indication of the classification in real-time for each of the one or more sliding time windows.

7. The system of claim 6, wherein the indication is at least one of: visual, audio, and haptic, and the indication is provided for display to a speaker of the audio data.

8. The system of claim 2, wherein the method further comprises:
storing the classification for each of the one or more sliding time windows to create stored classifications; and providing feedback for the audio data based at least on the stored classifications.

9. The system of claim 8, wherein the feedback comprises a pitch analysis and at least one of summary statistics, a grammar analysis, and a prosody analysis.

10. The system of claim 1, wherein generating the classification comprises comparing the weighted average PVQ to a threshold value for detecting monotone speech.

11. A method comprising:
receiving, by a speech processing device, audio data from a speaker during a speaking session;
calculating a first set of pitch values for the audio data;
removing pitch values of zero from the set of pitch values to generate a second set of pitch values;
clustering the second set of pitch values into a first cluster and a second cluster;
calculating, by the speech processing device, a first pitch variation quotient (PVQ) for the first cluster and a second cluster PVQ for the second cluster;
computing a weighted average PVQ using the first PVQ and the second PVQ, wherein the computing comprises:
multiplying a first weighted factor by the first PVQ to generate a first value;
multiplying a second weighted factor by the second PVQ to generate a second value; and
dividing a sum of the first value and the second value by a sum of the first weighted factor and the second weighted factor;
generating a real-time classification for the audio data based on the weighted average PVQ, wherein the real-time classification indicates the audio data is at least one of: monotone or non-monotone; and
providing, by the speech processing device, the real-time classification to the speaker during the speaking session.

12. The method of claim 11, wherein the audio data is being received in real-time during the speaking session.

13. The method of claim 11, wherein receiving audio data comprises buffering the audio data into a plurality of overlapping sliding time windows.

14. The method of claim 11, wherein the non-zero pitch values represent unvoiced data frames in the audio data.

15. The method of claim 11, wherein clustering the second set of pitch values comprises using at least one of: centroid-based clustering, distribution-based clustering, connectivity-based clustering, density-based clustering, and grid-based clustering.

16. The method of claim 11, further comprising:
generating a report for the speaking session, wherein the report comprises an indication of the weighted average PVQ.

17. A user interface for providing real-time feedback for monotone speech detection, wherein the user interface is configured to:
receive, by a speech processing mechanism, first real-time feedback to first audio data provided during a first portion of a speaking session, wherein the first audio data is divided into a first cluster of pitch values and a second cluster of pitch values, and a first weighted average pitch variation quotient (PVQ) is generated by:
multiplying a first weighted factor by a first PVQ of the first cluster to generate a first value;
multiplying a second weighted factor by a second PVQ of the second cluster to generate a second value; and
dividing a sum of the first value and the second value by a sum of the first weighted factor and the second weighted factor;
provide for display the first real-time feedback during the first portion of the speaking session;
receive, by the speech processing mechanism, second real-time feedback to second audio data provided during a second portion of the speaking session, wherein the second audio data is divided into a third cluster of pitch values and a fourth cluster of pitch values, and a second PVQ is generated based on the third cluster and the fourth cluster; and
provide for display the second real-time feedback during the second portion of the speaking session.

18. The user interface of claim 17, where the user interface is further configured to:
receive a summary report for the speaking session when the speaking session has concluded, wherein the summary report comprises at least an indication of the first real-time feedback and an indication of the second real-time feedback.

19. The user interface of claim 18, where the summary report further comprises at least one of: summary statistics, a grammar analysis, and a prosody analysis.

20. The user interface of claim 17, wherein the first real-time feedback and the second real-time feedback each provide an indication of whether received audio data is monotone.

* * * * *